United States Patent
Lindell et al.

(10) Patent No.: US 12,512,280 B2
(45) Date of Patent: Dec. 30, 2025

(54) METHOD OF PERFORMING CIRCUIT OPENING AND CLOSING OPERATION, COMPUTER PROGRAM, CONTROL SYSTEM AND POWER SYSTEM

(71) Applicant: ABB Schweiz AG, Baden (CH)

(72) Inventors: Elisabeth Lindell, Västerås (SE); Stefan Halen, Västerås (SE)

(73) Assignee: ABB Schweiz AG, Baden (CH)

( * ) Notice: Subject to any disclaimer, the term of this patent is extended or adjusted under 35 U.S.C. 154(b) by 164 days.

(21) Appl. No.: 18/440,540

(22) Filed: Feb. 13, 2024

(65) Prior Publication Data
US 2024/0331958 A1     Oct. 3, 2024

(30) Foreign Application Priority Data

Mar. 28, 2023  (EP) ..................... 23164524

(51) Int. Cl.
*H01H 9/56* (2006.01)
*H01H 33/59* (2006.01)

(52) U.S. Cl.
CPC .............. *H01H 9/56* (2013.01); *H01H 33/59* (2013.01); *H01H 2009/566* (2013.01)

(58) Field of Classification Search
CPC ........ H01H 9/0072; H01H 9/56; H01H 9/563; H01H 33/022; H01H 33/59; H01H 33/593; H01H 33/60; H01H 33/66; H01H 71/12; H01H 2009/566; H02H 3/021
USPC .......................................................... 361/5
See application file for complete search history.

(56) References Cited

U.S. PATENT DOCUMENTS

| | | | |
|---|---|---|---|
| 6,362,445 B1 * | 3/2002 | Marchand | H02B 13/0354 218/155 |
| 7,741,937 B2 * | 6/2010 | Mori | H01H 33/593 335/8 |
| 7,787,228 B2 * | 8/2010 | Koyama | H02P 13/00 361/78 |
| 10,622,170 B2 | 4/2020 | Lindell et al. | |
| 2012/0236443 A1 | 9/2012 | Kinoshita et al. | |

(Continued)

FOREIGN PATENT DOCUMENTS

| | | |
|---|---|---|
| EP | 3716431 A1 | 9/2020 |
| EP | 3646427 B1 | 7/2022 |
| WO | 2011116488 A1 | 9/2011 |

OTHER PUBLICATIONS

Extended European Search Report; Application No. 23164524.3; Competed: Aug. 24, 2023; Mailing Date: Sep. 1, 2023; 6 Pages.

*Primary Examiner* — Kevin J Comber
(74) *Attorney, Agent, or Firm* — Whitmyer IP Group LLC

(57) ABSTRACT

A method of performing a circuit opening and closing operation in a power system including three phases, a three-phase transformer, and a circuit breaker system, the method including a) opening all three phases simultaneously such that a reference current of a reference phase is interrupted first at a first current zero crossing after the opening; and b) closing all three phases simultaneously at a phase to ground voltage of the phase lagging the reference phase by 120°, in a time range of ±90° from a negative peak of said phase to ground voltage if the current zero crossing is a positive current zero crossing, or in a time range of ±90° from a positive peak of said phase to ground voltage if the current zero crossing is a negative current zero crossing.

15 Claims, 8 Drawing Sheets

(56) References Cited

U.S. PATENT DOCUMENTS

2013/0155553 A1  6/2013  Kawasaki et al.
2019/0044460 A1  2/2019  Jaap et al.
2020/0312592 A1* 10/2020 Lindell ................ H01H 9/0072

* cited by examiner

METHOD OF PERFORMING CIRCUIT OPENING AND CLOSING OPERATION, COMPUTER PROGRAM, CONTROL SYSTEM AND POWER SYSTEM

TECHNICAL FIELD

The present disclosure generally relates to circuit opening and closing operations. In particular, a method of performing a circuit opening and closing operation, a computer program, a control system and a power system, are provided.

BACKGROUND

Circuit breakers may in certain applications be subjected to a great plurality of circuit opening and closing operations. In for example electric arc furnace applications, the circuit breakers might wear out quickly due to being operated extremely frequently, such as around 100 times per day.

Traditionally, circuit breakers used for operating electric arc furnaces are not synchronized. In such non-synchronized circuit breakers, the circuit opening and closing operations are not synchronized with respect to the phase angle of the voltages (or currents) in the grid. This may lead to severe contact wear, especially considering that electric arc furnace circuit breakers are operated so frequently. It may also lead to severe transient stresses in the system; both in terms of reignitions at opening of the circuit breaker and inrush currents to the electric arc furnace transformer at closing.

EP 3716431 A1, the content of which is incorporated herein by reference in its entirety, discloses a method of performing a circuit-breaking and closing operation in a three-phase system having a first phase, a second phase lagging the first phase by 120°, and a third phase lagging the first phase by 240°, wherein the method comprises:
a) opening only one of the first phase, the second phase and the third phase before a current zero crossing of a current of the corresponding phase,
b) opening the remaining phases of the first phase, the second phase and the third phase after step a), and
c) closing the first phase, the second phase and the third phase simultaneously or essentially simultaneously at a phase to ground voltage of the phase of the first phase, the second phase and the third phase which is lagging the phase that was opened in step a) by 120° in a time range from 60° before a peak of said phase to 90° after the peak.

The method in EP 3716431 A1 prolongs the life of a circuit breaker, substantially reduces or eliminates transient overvoltages due to reignitions, and generally keeps inrush currents below acceptable limit values.

SUMMARY

One object of the invention is to provide an improved method of performing a circuit opening and closing operation in a power system.

A further object of the invention is to provide an improved computer program.

A still further object of the invention is to provide an improved control system for controlling a circuit breaker system connected to a three-phase power source.

A still further object of the invention is to provide an improved power system comprising a circuit breaker system.

These objects are achieved by the method according to, the computer program, the control system, and the power system according to appended claims.

The invention is based on the realization that by using a particular timing of simultaneous opening and simultaneous closing of phases in a three-phase power system as described herein, transient overvoltages due to reignitions at opening of the phases can be substantially reduced or eliminated, and inrush currents at closing of the phases can be kept low, while using a circuit breaker system of low complexity.

According to a first aspect, there is provided a method of performing a circuit opening and closing operation in a power system comprising a first phase, a second phase lagging the first phase by 120°, a third phase lagging the first phase by 240°, a three-phase transformer including Y-connected primary windings with ungrounded neutral or delta connected primary windings, and a circuit breaker system connected to the transformer, the method comprising:
a) controlling the circuit breaker system to open the first phase, the second phase and the third phase simultaneously or essentially simultaneously such that a reference current of a reference phase among the first phase, the second phase and the third phase is interrupted first at a first current zero crossing of the reference current after the opening; and
b) controlling the circuit breaker system to close the first phase, the second phase and the third phase simultaneously or essentially simultaneously at a phase to ground voltage of the phase among the first phase, the second phase and the third phase which is lagging the reference phase by 120°, in a time range from 90° before a negative peak of said phase to ground voltage to 90° after the negative peak of said phase to ground voltage if the current zero crossing is a positive current zero crossing, or in a time range from 90° before a positive peak of said phase to ground voltage to 90° after the positive peak of said phase to ground voltage if the current zero crossing is a negative current zero crossing.

In contrast to EP 3716431 A1, the method of the first aspects utilizes simultaneous pole operation at both opening and closing. However, due to the timing of the opening and closing of the phases in the method of the first aspect, also the method of the first aspect substantially reduces or eliminates transient overvoltages due to reignitions and generally keeps inrush currents below acceptable limit values. Thus, the method of the first aspect enables achieving the same performance as EP 3716431 A1 in terms of transient stresses. However, due to the simultaneous pole operation at both opening and closing, the method of the first aspect enables use of a less complicated circuit breaker system, such as a standard circuit breaker system which only permits simultaneous pole operations.

The transformer may be electrically connected directly or indirectly to the circuit breaker system. The circuit breaker system may be arranged electrically between a three-phase power source and the transformer. In this case, the three-phase power source and the transformer may be said to be arranged upstream and downstream, respectively, of the circuit breaker system.

In step a) the opening of the phases may be performed such that the reference current is interrupted first (i.e. before the currents associated with the two phases that are not the reference phase) at the first current zero crossing of the reference current after the opening of the phases without causing reignitions. The opening of the phases may for example be performed less than one sixth of a period before this current zero crossing. Alternatively, or in addition, the opening of the phases may for example be performed at least 20° before this current zero crossing and/or at least 1 ms before this current zero crossing.

At a positive current zero crossing, the current has a positive derivative. Conversely, at a negative current zero crossing, the current has a negative derivative.

With the term "essentially" hereabove is meant within a time range of the order of one or more tenths of a millisecond, such as within 0.5 milliseconds.

With the term "opening" is herein meant achieving contact separation. What is controlled by the opening is achieving contact separation. By the term "closing" is herein meant achieving contact touch. What is controlled by the closing is achieving contact touch. In order to open and close a phase, a pole or a pair of contacts associated with the phase may be opened and closed, respectively.

For each phase, the circuit breaker system may comprise a fixed contact and a movable contact. Each movable contact is movable between a closed position in contact with the associated fixed contact and an open position separated from the associated fixed contact.

The circuit breaker system may comprise three mechanically connected movable contacts, each for opening and closing a unique phase among the first phase, the second phase and the third phase. If a first movable contact is moved, the remaining two movable contacts will also move due to the mechanical connection therebetween. The mechanically connected movable contacts are however not electrically connected to each other.

In step b) the time range may be from 90° before a negative peak of said phase to ground voltage to 60° after the negative peak of said phase to ground voltage if the current zero crossing is a positive current zero crossing, or the time range may be from 90° before a positive peak of said phase to ground voltage to 60° after the positive peak of said phase to ground voltage if the current zero crossing is a negative current zero crossing.

In step b) the time range may be from 60° before a negative peak of said phase to ground voltage to 60° after the negative peak of said phase to ground voltage if the current zero crossing is a positive current zero crossing, or the time range may be from 60° before a positive peak of said phase to ground voltage to 60° after the positive peak of said phase to ground voltage if the current zero crossing is a negative current zero crossing.

In step b) the time range may be from 60° before a negative peak of said phase to ground voltage to 30° after the negative peak of said phase to ground voltage if the current zero crossing is a positive current zero crossing, or the time range may be from 60° before a positive peak of said phase to ground voltage to 30° after the positive peak of said phase to ground voltage if the current zero crossing is a negative current zero crossing.

The method may comprise selecting the reference phase in step a) such that the first phase, the second phase and the third phase are interrupted first equally or about equally often over 100, 500 or 1000 circuit opening operations. By using different phases as the reference phase in step a) for different circuit opening and closing operations in a manner such that statistically, in a large number of circuit opening and closing operations, the current of each phase has been interrupted first about an equal number of times in step a), the wear of the pole of a particular phase of the circuit breaker system may be reduced as the wear is spread evenly between all three poles.

According to the second aspect, there is provided a computer program comprising computer code which when executed by processing circuitry of a control system causes the control system to perform, or command performance of, the method according to the first aspect.

According to a third aspect, there is provided a control system for controlling a circuit breaker system connected to a three-phase transformer and to a three-phase power source having a first phase, a second phase lagging the first phase by 120°, and a third phase lagging the first phase by 240°, the transformer including Y-connected primary windings with ungrounded neutral or delta connected primary windings, wherein the control system comprises processing circuitry, and a storage medium comprising computer code which when executed by the processing circuitry causes the control system to perform, or command performance of, the method according to the first aspect.

According to a fourth aspect, there is provided a power system comprising a three-phase transformer including Y-connected primary windings with ungrounded neutral or delta connected primary windings; a circuit breaker system connected to the transformer, the circuit breaker system having a first pole, a second pole and a third pole; a control system according to the third aspect; and an actuating device configured to actuate the first pole, the second pole and the third pole, wherein the control system is configured to control the actuating device. The actuating device may for example be a single motor, a single servomotor, a single spring actuator or a single magnetic actuator. As one conceivable alternative, the actuating device may comprise three motors, three servomotors, three spring actuators or three magnetic actuators, each configured to actuate a unique pole among the first pole, the second pole and the third pole. The power system can efficiently suppress inrush currents to the transformer.

The circuit breaker system may be a circuit breaker, such as a vacuum circuit breaker.

The power system may further comprise three mechanically connected movable contacts, each forming part of a unique pole among the first pole, the second pole and the third pole, wherein the actuating device is configured to actuate the movable contacts.

The power system may be an electric arc furnace circuit breaker system. Alternatively, or in addition, a load may be arranged downstream of the power system. The load may be inductive or partially inductive. In the electric arc furnace circuit breaker system, the load to the transformer may be an electric arc furnace. That is, the electric arc furnace may be connected to a low voltage side of the transformer.

BRIEF DESCRIPTION OF THE DRAWINGS

Further details, advantages and aspects of the present disclosure will become apparent from the following description taken in conjunction with the drawings, wherein.

DETAILED DESCRIPTION

Figure 1:
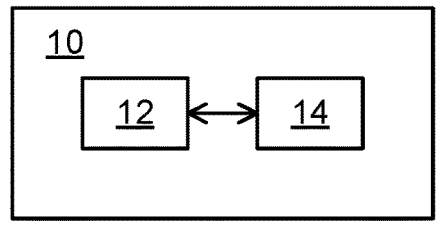
FIG. 1: is a schematic block diagram of a control system.

In the following, a method of performing a circuit opening and closing operation, a computer program, a control system and a power system, will be described. The same or similar reference numerals will be used to denote the same or similar structural features.

FIG. 1 is a schematic block diagram of a control system 10 according to one example. The control system 10 is configured to control performance of a circuit opening and closing operation. The control system 10 comprises processing circuitry 12 and a storage medium 14.

The processing circuitry 12 may for example use any combination of one or more of a suitable central processing unit (CPU), multiprocessor, microcontroller, digital signal processor (DSP), application specific integrated circuit (ASIC), field programmable gate arrays (FPGA) etc., capable of executing any herein disclosed circuit opening and closing operations.

The storage medium 14 may for example be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. A computer program according to the invention is stored in the storage medium 14.

Figure 2:
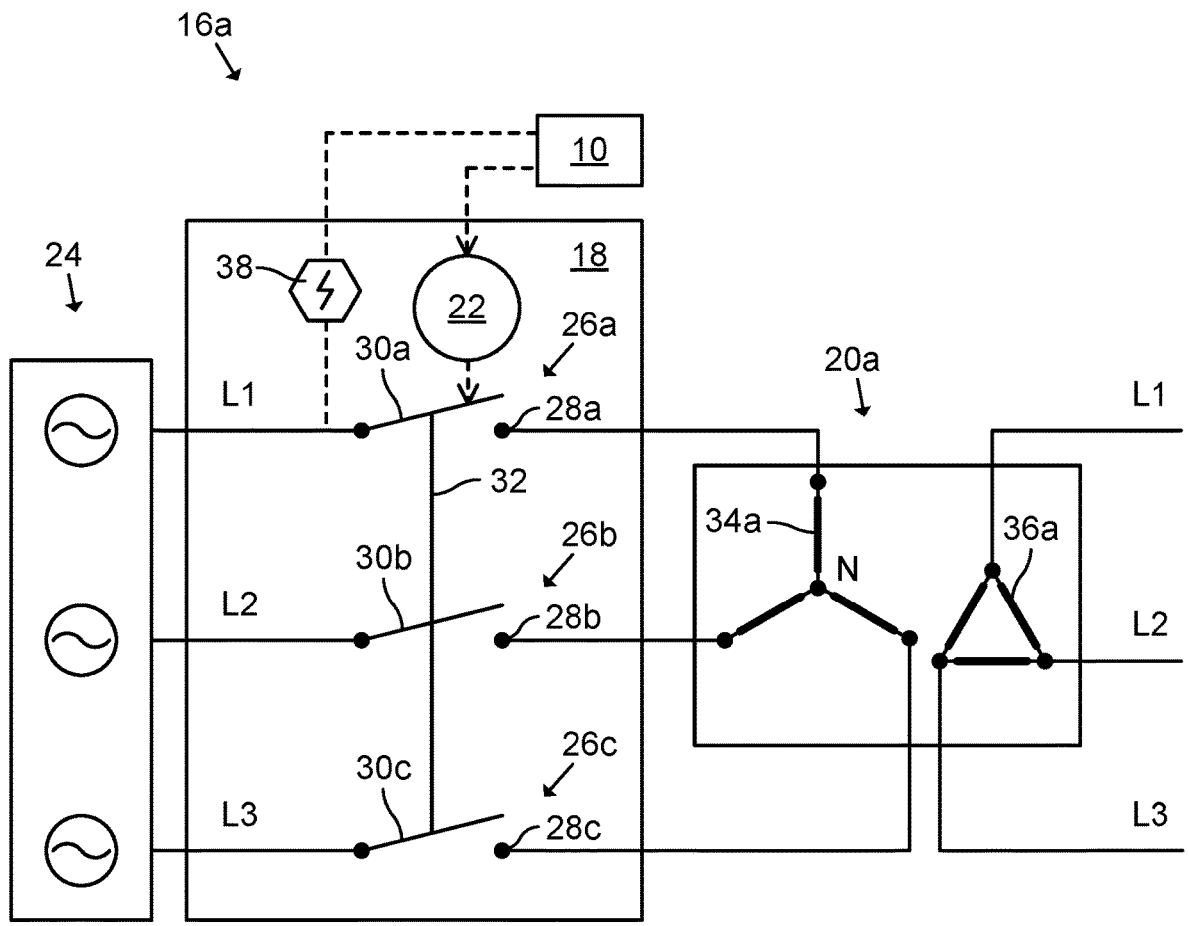
FIG. 2: schematically represents one example of a power system.

FIG. 2 schematically represents an alternating current, AC, power system 16a. The power system 16a comprises the control system 10, a circuit breaker system 18 and a three-phase transformer 20a. The circuit breaker system 18 is here exemplified as a vacuum circuit breaker system.

The circuit breaker system 18 of this example comprises an actuating device, in the following exemplified by a servomotor 22. FIG. 2 further shows a power source 24 providing three electrical phases: a first phase L1, of alternating current, a second phase L2 and a third phase L3. In this example, the second phase L2 lags the first phase L1 by 120° and the third phase L3 lags the second phase L2 by 120°. The phase sequence of this example is thus a positive phase sequence.

The exemplified circuit breaker system 18 is a three-phase circuit breaker system. The circuit breaker system 18 hence has three pairs of contacts or poles 26a-26c. More specifically, the circuit breaker system 18 comprises three poles 26a-26c, one for each phase L1-L3, with one contact gap in each pole 26a-26c. Each of the first pole 26a, the second pole 26b and the third pole 26c is configured to be connected to the first phase L1, the second phase L2 and the third phase L3, respectively.

The first pole 26a comprises a first fixed contact 28a and a first movable contact 30a. The first movable contact 30a is movable between a closed position in contact with the first fixed contact 28a and an open position separated from the first fixed contact 28a. The second pole 26b comprises a second fixed contact 28b and a second movable contact 30b. The second movable contact 30b is movable between a closed position in contact with the second fixed contact 28b and an open position separated from the second fixed contact 28b. The third pole 26c comprises a third fixed contact 28c and a third movable contact 30c. The third movable contact 30c is movable between a closed position in contact with the third fixed contact 28c and an open position separated from the third fixed contact 28c. Although FIG. 2 illustrates movable contacts 30a-30c as being arranged upstream of the fixed contacts 28a-28c, the movable contacts 30a-30c may alternatively be arranged downstream of the fixed contacts 28a-28c.

In this example, all three movable contacts 30a-30c are mechanically connected to each other. All three movable contacts 30a-30c are thereby forced to move in common between respective closed positions, where the respective phases L1-L3 associated with the poles 26a-26c are closed, and respective open positions, where the respective phases L1-L3 associated with the poles 26a-26c are opened.

The circuit breaker system 18 of this example comprises a rigid mechanical connection element 32 fixed to each of the movable contacts 30a-30c. Due to the mechanical connection element 32, the movable contacts 30a-30c are forced to move in common. The mechanical connection element 32 is here exemplified as a rigid bar but may be realized in alternative ways. The movable contacts 30a-30c do however not need to be mechanically connected in order to perform the method as described herein.

In the example in FIG. 2, the servomotor 22 acts on the first movable contact 30a, e.g., by pushing and pulling, to thereby collectively move all movable contacts 30a-30c between the respective closed positions and open positions. The servomotor 22 may however alternatively act on any of the second movable contact 30b, the third movable contact 30c or the mechanical connection element 32 to achieve the collective movement of the movable contacts 30a-30c.

The circuit breaker system 18 is configured to break partly or purely inductive loads. In an example where the circuit breaker system 18 is for electric arc furnace applications, the fixed contacts 28a-28c of each pole 26a-26c may also be connected to e.g., the electrodes of an electric arc furnace, here via the transformer 20a. A series reactor may also be arranged between the circuit breaker system 18 and the transformer 20a. The transformer 20a may be equipped with overvoltage protection devices, such as resistor-capacitor (RC) snubbers or surge arresters. In FIG. 2, the power source 24 is arranged upstream of the circuit breaker system 18 and the transformer 20a is arranged downstream of the circuit breaker system 18. The power source 24 may be an upstream grid or an upstream power supply system.

The transformer 20a of this example comprises Y-connected primary windings 34a with ungrounded neutral and delta connected secondary windings 36a. The power source 24 may provide medium voltage to the power system 16a. The primary windings 34a of the transformer 20a may operate at a medium voltage. The secondary windings 36a of the transformer 20a may operate at a voltage lower than the voltage at the the primary windings 34a, such as at a lower medium voltage or at a low voltage. As used herein, a low voltage may be less than 1 kV, and/or a high voltage may be at least 52 kV. A medium voltage is higher than the low voltage and lower than the high voltage.

As an alternative to the illustrated circuit breaker system 18, the circuit breaker system 18 could comprise three single-phase circuit breakers, three single-phase switches or a three-phase switch, three single-phase contactors or a three-phase contactor, or three single-phase load break switches or a three-phase load break switch. When the circuit breaker system 18 comprises three single-phase circuit breakers, three single-phase switches, three single-phase contactors or three single-phase load break switches, the circuit breakers, the single-phase switches, the single-phase contactors or the single-phase load break switches, respectively, may or may not be mechanically connected.

The control system 10 is configured to control the servomotor 22. The servomotor 22 is configured to collectively operate the movable contacts 30a-30c of the poles 26a-26c between respective open positions and closed positions based on control signals received from the control system 10. Each pole 26a-26c is thus controlled by a common servomotor 22.

The power system 16a of this example further comprises a voltage sensor 38, here arranged upstream of the first pole 26a. The voltage sensor 38 senses a phase to ground voltage of one of the phases, here the first phase L1, and outputs a corresponding voltage signal to the control system 10. Based on the voltage signal, the control system 10 is configured to determine when to open and close the phases L1-L3, and when to send corresponding control signals to the servomotor 22. In order to do this, it can be assumed that there is a symmetrical phase shift of the other two phases with respect to the phase for which the phase to ground voltage has been sensed. The control system 10 is thus arranged to provide data relating to the voltages in the phases L1-L3 on the grid side of the circuit breaker system 18 and to send control signals to the servomotor 22 based on this data.

Figure 3:
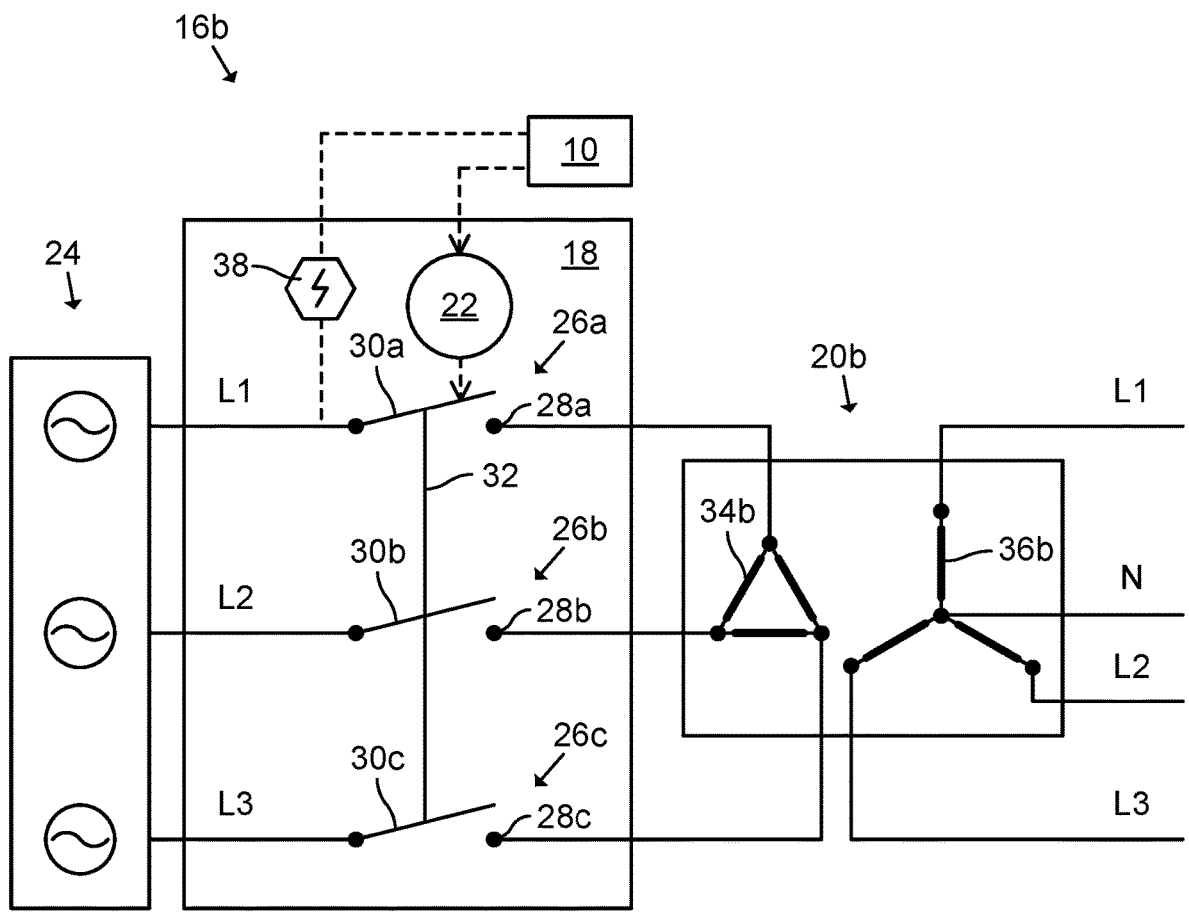
FIG. 3: schematically represents a further example of a power system.

FIG. 3 schematically represents a further example of a power system 16b. The power system 16b differs from the power system 16a in that the power system 16b comprises a transformer 20b different from the transformer 20a. The transformer 20b of this example comprises delta connected primary windings 34b and Y-connected secondary windings 36b. A further example of a transformer (not illustrated) suitable for the method of the invention may comprise delta connected primary windings and delta connected secondary windings. A still further example of a transformer (not illustrated) suitable for the method of the invention may comprise Y-connected primary windings and Y-connected secondary windings.

Figure 4:
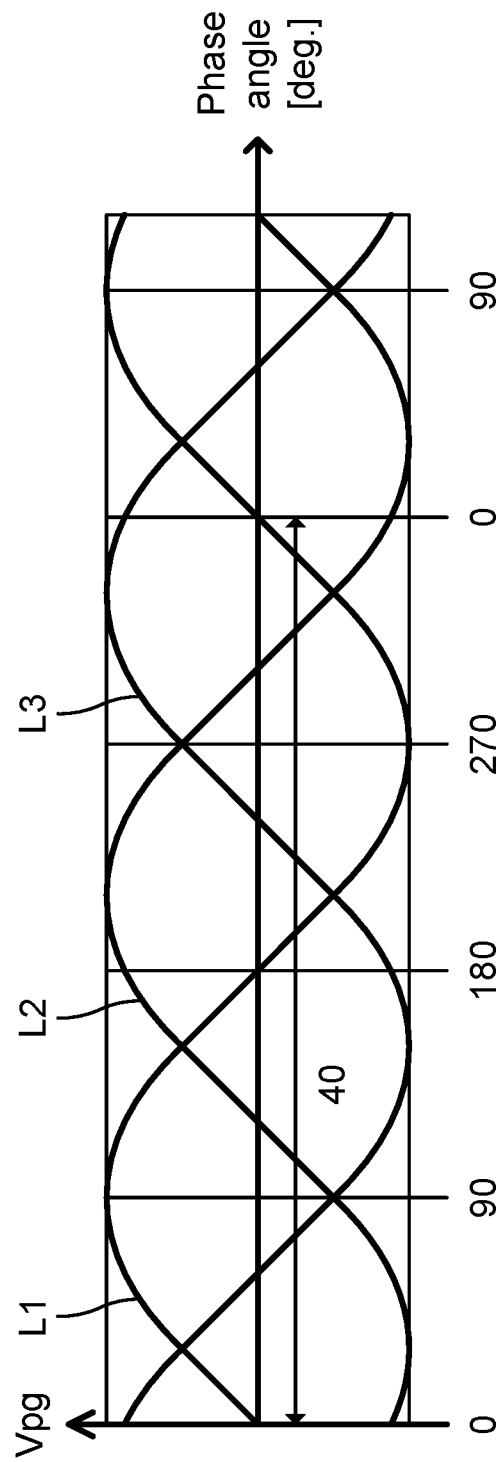
FIG. 4: is a graph of phase to ground voltage of three phases.

FIG. 4 is a graph of phase to ground voltage Vpg of the three phases L1-L3 as a function of phase angles. FIG. 4 further shows a duration of a period 40.

Figure 5:
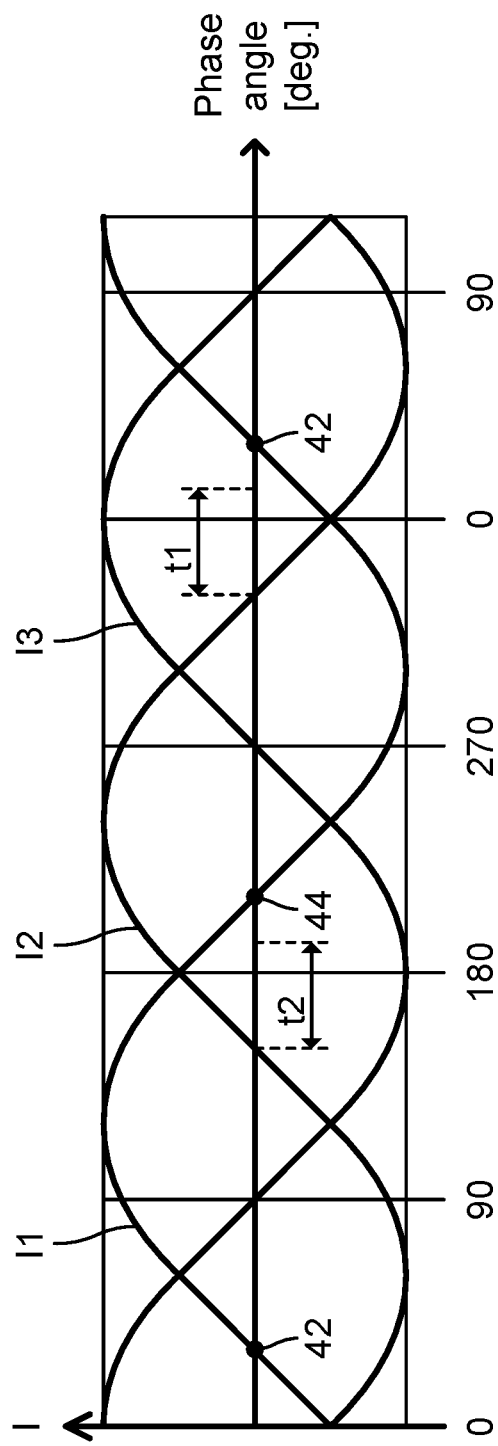
FIG. 5: is a graph of currents of the three phases.

FIG. 5 is a graph of currents I of the three phases L1-L3 as a function of phase angles, namely a first current I1 of the first phase L1, a second current I2 of the second phase L2, and a third current I3 of the third phase L3. FIG. 5 shows two positive current zero crossings 42 and one negative current zero crossing 44 of the first current I1.

In order to open a phase such that the current of the phase is interrupted at a first current zero crossing 42, 44 after the opening, the phase may be opened before the respective current zero crossing 42, 44. The terms "before a current zero crossing" typically means a time range of less than one sixth of a period 40 before the current zero crossing 42, 44 and at least 1 ms before the current zero crossing 42, 44. FIG. 5 shows schematic examples of such time periods, namely a first time period t1 and a second time period t2. The first time period t1 is 60° to 20° before the positive current zero crossing 42, i.e., from 3.33 ms to 1.11 ms before the positive current zero crossing 42 at 50 Hz. The second time period t2 is 60° to 20° before the negative current zero crossing 44. For example, in order to open the phases L1-L3 simultaneously such that the first current I1 is interrupted first at a first positive current zero crossing 42 after the opening without reignition, all phases L1-L3 may be opened simultaneously in the first time period t1. Conversely, in order to open the phases L1-L3 simultaneously such that the first current I1 is interrupted first at a first negative current zero crossing 44 after the opening without reignition, all phases L1-L3 may be opened simultaneously in the second time period t2.

Figure 6:
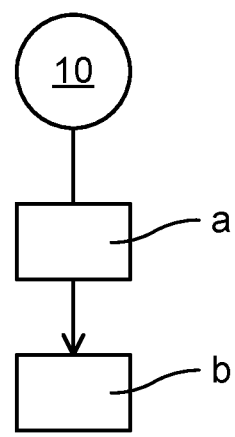
FIG. 6: is a flowchart outlining general steps of a method.

FIG. 6 is a flowchart outlining general steps of a method of performing a circuit opening and closing operation in the power system 16a, 16b according to the invention.

In a step a) the circuit breaker system 18 is controlled to open the first phase L1, the second phase L2 and the third phase L3 simultaneously or essentially simultaneously such that a reference current of a reference phase among the first phase L1, the second phase L2 and the third phase L3 is interrupted first at a first current zero crossing 42, 44 of the reference current after the opening. Hereto, the control system 10 is configured to provide a control signal to the servomotors 22 to open all poles 26a-26c. For example, if all poles 26a-26c are opened simultaneously or essentially simultaneously such that the first current I1 is interrupted first at a first current zero crossing 42, 44 of the first current I1 after the opening of all poles 26a-26c, the first current I1 becomes the reference current and the first phase L1 becomes the reference phase. The current zero crossing 42, 44 may be either a positive current zero crossing 42 or a negative current zero crossing 44.

According to one example, the timing of the opening of the phases L1-L3 in step a) may be varied such that each of the first phase L1, the second phase L2 and the third phase L3 becomes the reference phase equally or about equally often over 100, 500 or 1000 circuit opening operations. For example, in order to make the second phase L2 become the reference phase, the control system 10 can control the timing of the opening in step a) such that the second current I2 of the second phase L2 is interrupted first at a first current zero crossing 42, 44 of the second current I2 after the opening. The equipment connected to each phase L1-L3 will thereby be exposed to a more even stress over time.

The control system 10 may be configured to monitor the voltage, such as by the voltage sensor 38, in at least one of the first phase L1, the second phase L2, and the third phase L3 in order to be able to determine when a current zero crossing 42, 44 of a particular phase is going to occur. Step a) may be performed based on a determination of the current in at least one of the phases L1-L3. To be able to use only voltage sensor 38, an assumption about the power factor may be made in order to determine the timings of the current zero crossing 42, 44.

In a step b) the circuit breaker system 18 is controlled to close the first phase L1, the second phase L2 and the third phase L3 simultaneously or essentially simultaneously at a phase to ground voltage Vpg of the phase among the first phase L1, the second phase L2 and the third phase L3 which is lagging the reference phase by 120°, in a time range from 90° before a negative peak of said phase to ground voltage to 90° after the negative peak of said phase to ground voltage Vpg if the current zero crossing is a positive current zero crossing 42, or in a time range from 90° before a positive peak of said phase to ground voltage Vpg to 90° after the positive peak of said phase to ground voltage Vpg if the current zero crossing is a negative current zero crossing 44.

The method thus utilizes simultaneous pole operation at both opening and closing. 0° of the phase to ground voltage Vpg of a phase L1-L3 is at a positive voltage zero crossing of the phase to ground voltage Vpg of that phase L1-L3. At a positive voltage zero crossing, the voltage has a positive derivative. If for example the first phase L1 is the reference phase, the phase lagging the reference phase is the second phase L2 for a positive phase sequence. The phase to ground voltage Vpg of the phase lagging the reference phase is thus in this case the phase to ground voltage Vpg of the second phase L2. In the method, any of the first phase L1, the second phase L2 and the third phase L3 may be the reference phase. Moreover, the method may be carried out for both positive and negative phase sequences. Table 1 below shows the timing of the closing of the phases L1-L3 in step b) for different reference phases, different phase sequences and different types of zero crossings (positive or negative) of the reference current in step a).

TABLE 1

| Reference phase in step a) | Phase sequence Positive Zero crossing of reference current in step a) Positive Time range for simultaneous closing in step b) | Phase sequence Positive Zero crossing of reference current in step a) Negative Time range for simultaneous closing in step b) | Phase sequence Negative Zero crossing of reference current in step a) Positive Time range for simultaneous closing in step b) | Phase sequence Negative Zero crossing of reference current in step a) Negative Time range for simultaneous closing in step b) |
|---|---|---|---|---|
| L1 is reference phase | ±90 of negative peak of L2 | ±90 of positive peak of L2 | ±90 of negative peak of L3 | ±90 of positive peak of L3 |
| L2 is reference phase | ±90 of negative peak of L3 | ±90 of positive peak of L3 | ±90 of negative peak of L1 | ±90 of positive peak of L1 |
| L3 is reference phase | ±90 of negative peak of L1 | ±90 of positive peak of L1 | ±90 of negative peak of L2 | ±90 of positive peak of L2 |

Due to the simultaneous opening and closing of all the phases L1-L3 in steps a) and b), a less complicated circuit breaker system 18 can be used to maneuver the movable contacts 30a-30c between closed positions and open positions, such as a standard circuit breaker system 18 where all three movable contacts 30a-30c are mechanically connected. When all three movable contacts 30a-30c are mechanically connected, the method in EP 3716431 A1 cannot be performed using the circuit breaker system 18.

Figure 7:
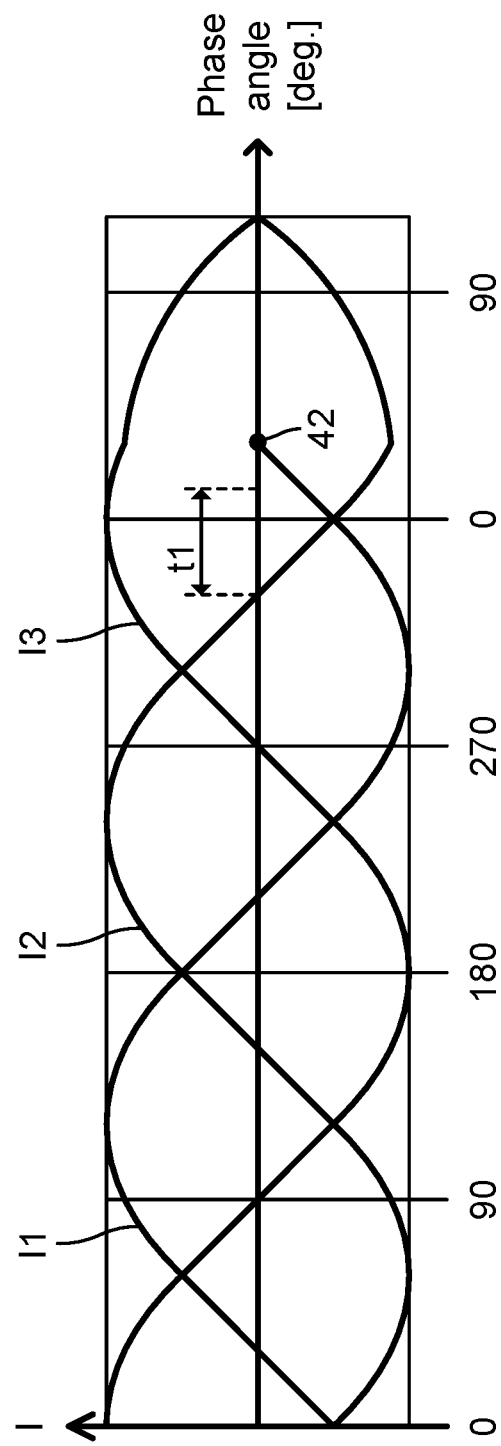
FIG. 7: is a graph of currents when the three phases are opened simultaneously.

FIG. 7 is a graph of currents I when the three phases L1-L3 are opened simultaneously in step a) of the method. Due to the transformer being either a transformer 20a including Y-connected primary windings 34a with ungrounded neutral, or a transformer 20b including delta connected primary windings 34b, if the first phase L1 is the reference phase such that the first current I1 is interrupted first at the positive current zero crossing 42, there will be an arc burning in each of the second and third poles 26b and 26c after the interruption of the first current I1 when all phases L1-L3 are opened simultaneously in step a). The second and third currents I2 and I3 will then be interrupted at the same instant as in EP 3716431 A1, i.e., a quarter period 40 after the interruption of the first current I1. Thus, the interruption of the currents I1-I3 will effectively be the same as in EP 3716431 A1. As a consequence, the inrush currents at closing of the phases L1-L3 will be as low as in EP 3716431 A1.

Since time durations of the arcs burning in the remaining phases (i.e., the phases other than the reference phase) will be increased in comparison with EP 3716431 A1, the wear on the poles of the remaining phases will be increased. However, by using a permutation of which phase is used as the reference phase over a plurality of circuit opening and closing operations, the wear on the poles can be distributed more evenly between the poles. Consequently, a maximum wear of the poles is reduced and a life of the circuit breaker system 18 can be prolonged. The effect of wear reduction due to this permutation is very prominent in the method of the invention using simultaneous opening and simultaneous closing of phases L1-L3.

Figure 8:
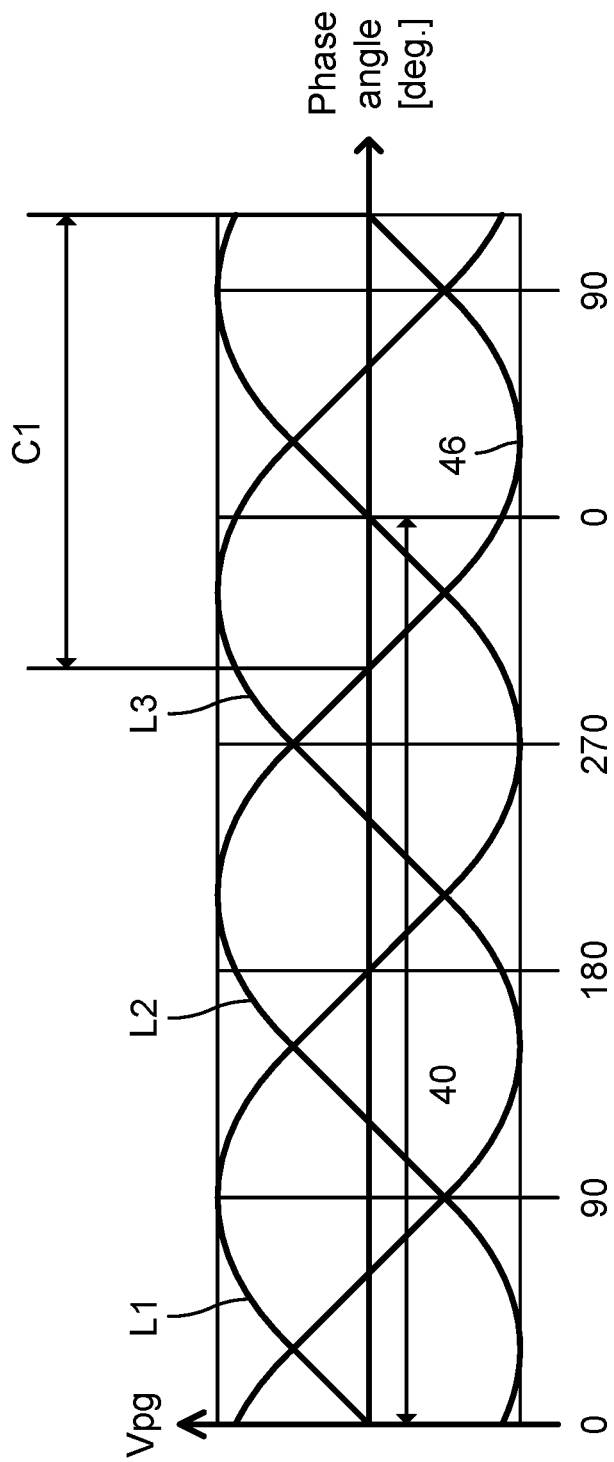
FIG. 8: is a graph of the phase to ground voltage and one example of a time range.

FIG. 8 is a graph of the phase to ground voltage Vpg upstream of the circuit breaker system 18 and one example of a time range C1 in step b) when the current zero crossing in step a) is a positive current zero crossing 42. FIG. 8 further shows a negative peak 46 of the phase to ground voltage Vpg of the second phase L2. That is, the second phase L2 is a phase lagging the reference phase by 120° if the first phase L1 is the reference phase for a positive phase sequence. The time range C1 in FIG. 8 is from 90° before the negative peak 46 to 90° after the negative peak 46 of the phase to ground voltage Vpg of the phase lagging the reference phase by 120°, here of the second phase L2 lagging the first phase L1 by 120°.

According to one example, the time range C1 in step b) is more narrow, such as from 90° before the negative peak 46 to 60° after the negative peak 46, such as from 60° before the negative peak 46 to 60° after the negative peak 46, such as from 60° before the negative peak 46 to 30° after the negative peak 46, of the phase (here the second phase L2) lagging the reference phase (here the first phase L1) by 120° if the current zero crossing is a positive current zero crossing 42.

Figure 9:
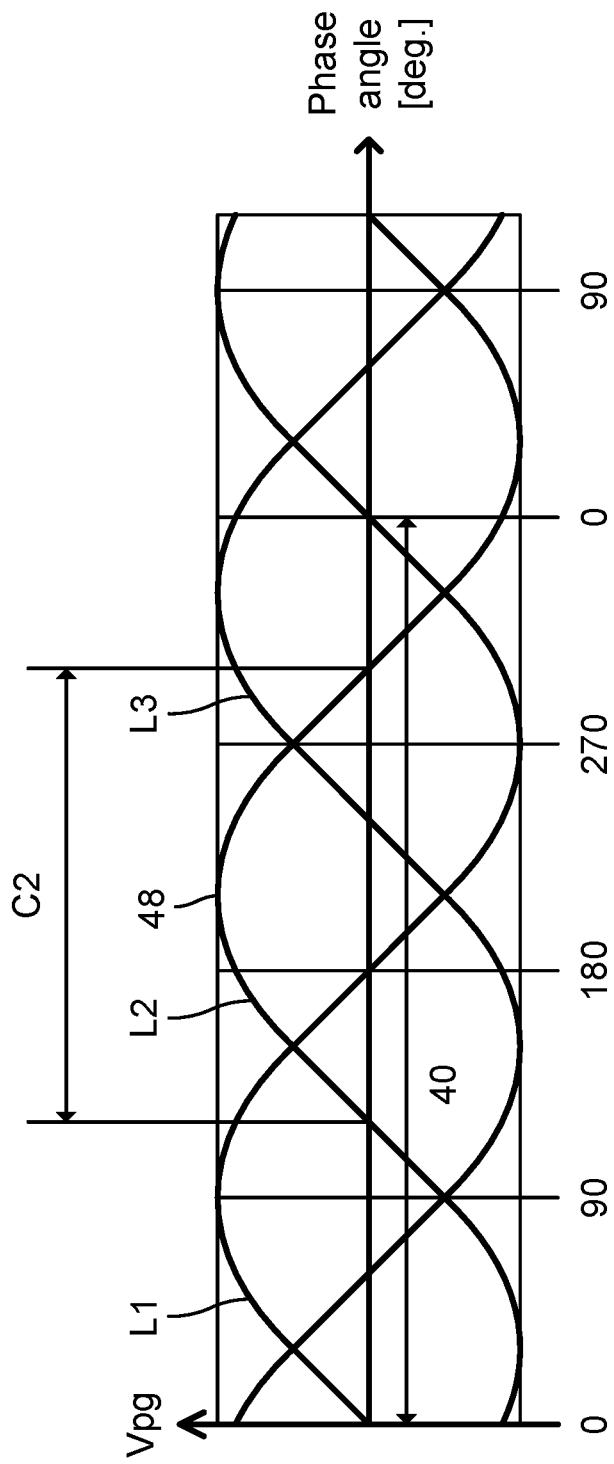
FIG. 9: is a graph of the phase to ground voltage and a further example of a time range.

FIG. 9 is a graph of the phase to ground voltage Vpg upstream of the circuit breaker system 18 and a further example of a time range C2 in step b) when the current zero crossing in step a) is a negative current zero crossing 44. FIG. 9 further shows a positive peak 48 of the phase to ground voltage Vpg of the second phase L2. That is, the second phase L2 is a phase lagging the reference phase by 120° if the first phase L1 is the reference phase for a positive phase sequence. The time range C2 in FIG. 9 is from 90° before the positive peak 48 to 90° after the positive peak 48 of the phase to ground voltage Vpg of the phase lagging the reference phase by 120°, here of the second phase L2 lagging the first phase L1 by 120°.

According to one example, the time range C2 in step b) is more narrow, such as from 90° before the positive peak 48 to 60° after the positive peak 48, such as from 60° before the positive peak 48 to 60° after the positive peak 48, such as from 60° before the positive peak 48 to 30° after the positive peak 48, of the phase (here the second phase L2) lagging the reference phase (here the first phase L1) by 120° if the current zero crossing is a negative current zero crossing 44.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of performing a circuit opening and closing operation in a power system including a first phase, a second phase lagging the first phase by 120°, a third phase lagging the first phase by 240°, a three-phase transformer including Y-connected primary windings with ungrounded neutral or delta connected primary windings, and a circuit breaker system connected to the transformer, the method comprising:
   a) controlling the circuit breaker system to open the first phase, the second phase and the third phase simultaneously or essentially simultaneously such that a reference current of a reference phase among the first phase, the second phase and the third phase is interrupted first at a first current zero crossing of the reference current after the opening; and
   b) controlling the circuit breaker system to close the first phase, the second phase and the third phase simultaneously or essentially simultaneously at a phase to ground voltage of the phase among the first phase, the second phase and the third phase which is lagging the reference phase by 120°, in a time range from 90° before a negative peak of said phase to ground voltage to 90° after the negative peak of said phase to ground voltage if the current zero crossing is a positive current zero crossing, or in a time range from 90° before a positive peak of said phase to ground voltage to 90° after the positive peak of said phase to ground voltage if the current zero crossing is a negative current zero crossing.

2. The method as claimed in claim 1, wherein the circuit breaker system comprises three mechanically connected movable contacts, each for opening and closing a unique phase among the first phase, the second phase and the third phase.

3. The method as claimed in claim 2, wherein the time range is from 90° before a negative peak of said phase to ground voltage to 60° after the negative peak of said phase to ground voltage if the current zero crossing is a positive current zero crossing, or the time range is from 90° before a positive peak of said phase to ground voltage to 60° after the positive peak of said phase to ground voltage if the current zero crossing is a negative current zero crossing.

4. The method as claimed in claim 2, wherein the time range is from 60° before a negative peak of said phase to ground voltage to 60° after the negative peak of said phase to ground voltage if the current zero crossing is a positive current zero crossing, or the time range is from 60° before a positive peak of said phase to ground voltage to 60° after the positive peak of said phase to ground voltage if the current zero crossing is a negative current zero crossing.

5. The method as claimed in claim 2, wherein the time range is from 60° before a negative peak of said phase to ground voltage to 30° after the negative peak of said phase to ground voltage if the current zero crossing is a positive current zero crossing, or the time range is from 60° before a positive peak of said phase to ground voltage to 30° after the positive peak of said phase to ground voltage if the current zero crossing is a negative current zero crossing.

6. The method as claimed in claim 2, further comprising selecting the reference phase in step a) such that the first phase, the second phase and the third phase are interrupted first equally or about equally often over 100, 500 or 1000 circuit opening operations.

7. The method as claimed in claim 1, wherein the time range is from 90° before a negative peak of said phase to ground voltage to 60° after the negative peak of said phase to ground voltage if the current zero crossing is a positive current zero crossing, or the time range is from 90° before a positive peak of said phase to ground voltage to 60° after the positive peak of said phase to ground voltage if the current zero crossing is a negative current zero crossing.

8. The method as claimed in claim 1, wherein the time range is from 60° before a negative peak of said phase to ground voltage to 60° after the negative peak of said phase to ground voltage if the current zero crossing is a positive current zero crossing, or the time range is from 60° before a positive peak of said phase to ground voltage to 60° after the positive peak of said phase to ground voltage if the current zero crossing is a negative current zero crossing.

9. The method as claimed in claim 1, wherein the time range is from 60° before a negative peak of said phase to ground voltage to 30° after the negative peak of said phase to ground voltage if the current zero crossing is a positive current zero crossing, or the time range is from 60° before a positive peak of said phase to ground voltage to 30° after the positive peak of said phase to ground voltage if the current zero crossing is a negative current zero crossing.

10. The method as claimed in claim 1, further comprising selecting the reference phase in step a) such that the first phase, the second phase and the third phase are interrupted first equally or about equally often over 100, 500 or 1000 circuit opening operations.

11. A non-transitory computer-readable storage medium comprising instructions which, when executed by processing circuitry of a control system, causes the control system to perform, or command performance of, a method of performing a circuit opening and closing operation in a power system having a first phase, a second phase lagging the first phase by 120°, a third phase lagging the first phase by 240°, a three-phase transformer including Y-connected primary windings with ungrounded neutral or delta connected primary windings, and a circuit breaker system connected to the transformer, the method including:
   a) controlling the circuit breaker system to open the first phase, the second phase and the third phase simultaneously or essentially simultaneously such that a reference current of a reference phase among the first phase, the second phase and the third phase is interrupted first at a first current zero crossing of the reference current after the opening; and
   b) controlling the circuit breaker system to close the first phase, the second phase and the third phase simultaneously or essentially simultaneously at a phase to ground voltage of the phase among the first phase, the second phase and the third phase which is lagging the reference phase by 120°, in a time range from 90° before a negative peak of said phase to ground voltage to 90° after the negative peak of said phase to ground voltage if the current zero crossing is a positive current zero crossing, or in a time range from 90° before a positive peak of said phase to ground voltage to 90° after the positive peak of said phase to ground voltage if the current zero crossing is a negative current zero crossing.

12. A control system for controlling a circuit breaker system connected to a three-phase transformer and to a three-phase power source having a first phase, a second phase lagging the first phase by 120°, and a third phase lagging the first phase by 240°, the transformer including Y-connected primary windings with ungrounded neutral or delta connected primary windings, wherein the control system comprises:

processing circuitry, and a non-transitory computer-readable storage medium including instructions which, when executed by the processing circuitry, causes the control system to perform, or command performance of, a method including the steps of a) controlling the circuit breaker system to open the first phase, the second phase and the third phase simultaneously or essentially simultaneously such that a reference current of a reference phase among the first phase, the second phase and the third phase is interrupted first at a first current zero crossing of the reference current after the opening; and b) controlling the circuit breaker system to close the first phase, the second phase and the third phase simultaneously or essentially simultaneously at a phase to ground voltage of the phase among the first phase, the second phase and the third phase which is lagging the reference phase by 120°, in a time range from 90° before a negative peak of said phase to ground voltage to 90° after the negative peak of said phase to ground voltage if the current zero crossing is a positive current zero crossing, or in a time range from 90° before a positive peak of said phase to ground voltage to 90° after the positive peak of said phase to ground voltage if the current zero crossing is a negative current zero crossing.

13. A power system comprising:

a three-phase transformer including Y-connected primary windings with ungrounded neutral or delta connected primary windings;

a circuit breaker system connected to the transformer, the circuit breaker system having a first pole, a second pole and a third pole that are configured to connect to a three-phase power source having a first phase, a second phase lagging the first phase by 120°, and a third phase lagging the first phase by 240°;

an actuating device configured to actuate the first pole, the second pole and the third pole; and a control system configured to:

a) control the actuating device to open the first phase, the second phase and the third phase simultaneously or essentially simultaneously such that a reference current of a reference phase among the first phase, the second phase and the third phase is interrupted first at a first current zero crossing of the reference current after the opening; and b) control the actuating device to close the first phase, the second phase and the third phase simultaneously or essentially simultaneously at a phase to ground voltage of the phase among the first phase, the second phase and the third phase which is lagging the reference phase by 120°, in a time range from 90° before a negative peak of said phase to ground voltage to 90° after the negative peak of said phase to ground voltage if the current zero crossing is a positive current zero crossing, or in a time range from 90° before a positive peak of said phase to ground voltage to 90° after the positive peak of said phase to ground voltage if the current zero crossing is a negative current zero crossing.

14. The power system as claimed in claim 13, further comprising three mechanically connected movable contacts, each forming part of a unique pole among the first pole, the second pole and the third pole, wherein the actuating device is configured to actuate the movable contacts.

15. The power system as claimed in claim 13, wherein the power system is an electric arc furnace circuit breaker system.

* * * * *